(12) United States Patent
Wallner

(10) Patent No.: US 9,264,597 B2
(45) Date of Patent: Feb. 16, 2016

(54) SENSOR STATE MAP FOR MANAGING OPERATIONAL STATES OF AN IMAGE SENSOR

(75) Inventor: John D. Wallner, Calabasas, CA (US)

(73) Assignee: AltaSens, Inc., Westlake Village, CA (US)

(*) Notice: Subject to any disclaimer, the term of this patent is extended or adjusted under 35 U.S.C. 154(b) by 967 days.

(21) Appl. No.: 13/293,593

(22) Filed: Nov. 10, 2011

(65) Prior Publication Data

US 2013/0119241 A1    May 16, 2013

(51) Int. Cl.
*H04N 5/232*    (2006.01)
*H04N 5/374*    (2011.01)

(52) U.S. Cl.
CPC .............. *H04N 5/232* (2013.01); *H04N 5/374* (2013.01)

(58) Field of Classification Search
CPC .................................................... H01S 5/0021
USPC ............. 250/214 P; 348/294–324; 372/38.09
See application file for complete search history.

(56) References Cited

U.S. PATENT DOCUMENTS

2004/0155175 A1*  8/2004  McNulty ................... 250/208.1
2005/0114567 A1*  5/2005  Lambrache et al. ............ 710/52

* cited by examiner

*Primary Examiner* — Renee D Chavez
(74) *Attorney, Agent, or Firm* — Amin, Turocy & Watson, LLP

(57) ABSTRACT

Systems and methods are provided to implement a state map to control operations of a complementary metal-oxide-semiconductor (CMOS) sensor. The state map can be a table comprising one or more locations. Each of the locations can comprise a destination state to define the operations of the sensor and an exit criterion to advance to a next location in the state map. For example, an operation sequence can be implemented using the state map to instruct the CMOS sensor to perform a specific set of operations. Further, a data value to represent the destination state and/or a variable input can be stored in a writable address of a register. Thus, a simplified architecture can be provided to implement CMOS sensor operation states, for instance, to improve interactions between real time and non-real time signals and to increase functionality of the CMOS sensor.

20 Claims, 14 Drawing Sheets

SENSOR STATE MAP FOR MANAGING OPERATIONAL STATES OF AN IMAGE SENSOR

BACKGROUND

Recent developments in semiconductor technology include the complementary metal-oxide-semiconductor (CMOS). CMOS is a technology employed in constructing integrated circuits, producing semiconductor devices having a wide variety of uses in electronic components. These uses can include, for instance, microprocessors, microcontrollers, static random access memory, and other digital logic circuits. Analog uses include data integrators, and integrated transceivers employed in electronic communication, as well as for image sensors.

One particular type of image sensor leveraging CMOS technology is the CMOS image sensor. A CMOS image sensor can be incorporated into a System-on-Chip (SoC). As such, the SoC can integrate various components (e.g., analog, digital, . . . ) associated with imaging into a common integrated circuit. For instance, the SoC can include a microprocessor, microcontroller, or digital signal processor (DSP) core, memory, analog interfaces (e.g., analog to digital converters, digital to analog converters), and so forth.

Visible imaging systems utilizing CMOS imaging sensors can reduce manufacturing costs for such systems, reduce power consumption of an electronic device, and reduce electronic noise, while improving optical resolution. For instance, cameras can use CMOS imaging System-on-Chip (iSoC) sensors that efficiently marry low-noise image detection and signal processing with multiple supporting blocks that can provide timing control, clock drivers, reference voltages, analog to digital conversion, digital to analog conversion and key signal processing elements. High-performance video cameras can thereby be assembled using a single CMOS integrated circuit supported by few components including a lens and a battery, for instance. Accordingly, by leveraging iSoC sensors, camera size can be decreased and battery life can be increased. The iSoC sensor has also facilitated the advent of more advanced optical recording devices, including dual-use cameras that can alternately produce high-resolution still images or high definition (HD) video.

An image sensor converts an optical image into an electronic signal. This electronic signal can then be processed and reproduced, for instance on a display screen. Typically, the image sensor comprises an array of many active pixels; each active pixel comprising a CMOS photodetector (e.g., photogate, photoconductor, photodiode, . . . ) controlled by circuits of digitally controlled transistors. The CMOS photodetector can absorb electromagnetic radiation in or around the visible spectrum (or more typically a subset of the visible spectrum—such as blue wavelengths, red wavelengths, green wavelengths, etc.), and output an electronic signal proportionate to the electromagnetic energy absorbed.

Electronic imaging devices, such as digital cameras and particularly video recorders, capture and display many optical images per second (e.g., 30 per second, 60 per second, 70 per second, 120 per second, . . . ), equal to the optical frame rate of the imaging device. Capturing a single image in a single frame time involves multiple operations at the CMOS pixel array and readout circuit. One mechanism for image capture is referred to as a rolling shutter. As an example, rolling shutter operations can include capture and convert (e.g., capture light information and convert to electrical information), readout, and reset operations. Some frames can be constructed so that the capture and convert operation, and the reset operation are performed in a single reset cycle, for instance, with reset of a prior frame occurring at a beginning of the reset operation, and capture and convert of a current frame occurring at the end of the reset operation. Thus, alternating reset and readout cycles can clear the CMOS photodetector array, capture a new image, and output the captured image for processing.

Conventional images sensors communicate with external components on the iSoC to control the image sensor operations (e.g., readout operations, reset operations, etc.). Common external components on the iSoC include a processor, serial peripheral interface (SPI), and a field programmable gate array (FPGA) to maintain the image sensor operations. Since timing in the image sensor is often very specific, the FPGA communicates with the image sensor using real time signals. The processor and SPI communicate with the image sensor using non-real time signals. However, the non-real time signals do not allow precise control of timing. For example, the image sensor may need to read out data five clock cycles after the rising edge of a synchronization signal. If the data is not read out five clock cycles after the rising edge of a synchronization signal, the image sensor operations can be hindered. Since real time signals and non-real time signals are used to communicate to the image sensor, fine control of timing is often very difficult. As a result, complicated interactions between the non-real time signals and the real time signals are used to control the image sensor operations. Consequently, conventional image sensors do not allow versatile implementation for multiple applications and/or complex image sensor operations.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

The claimed subject matter relates to systems and/or methods to implement a state map to control operations of a complementary metal-oxide-semiconductor (CMOS) sensor. The state map can be a table comprising one or more locations. Each of the locations can comprise a destination state to define the operations of the sensor and an exit criterion to advance to a next location in the state map. For example, an operation sequence can be implemented using the state map to instruct the CMOS sensor to perform a specific set of operations. Further, a data value to represent the destination state and/or a variable input can be stored in a writable address of a register. Thus, a simplified architecture can be provided to implement CMOS sensor operation states, for instance, to improve interactions between real time and non-real time signals and to increase functionality of the CMOS sensor.

According to various aspects, an integrated circuit can be configured to generate one or more signals to control timing of one or more operations of a sensor. Further, a sensor component can be configured to implement the one or more operations using a state map. The state map can be a table that comprises one or more locations with a corresponding destination state to define the one or more operations and an exit criterion to advance to a next location in the state map. Additionally, one or more registers can each be configured to store a data value to represent one of the destination states and/or a variable input.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

Figure 1:
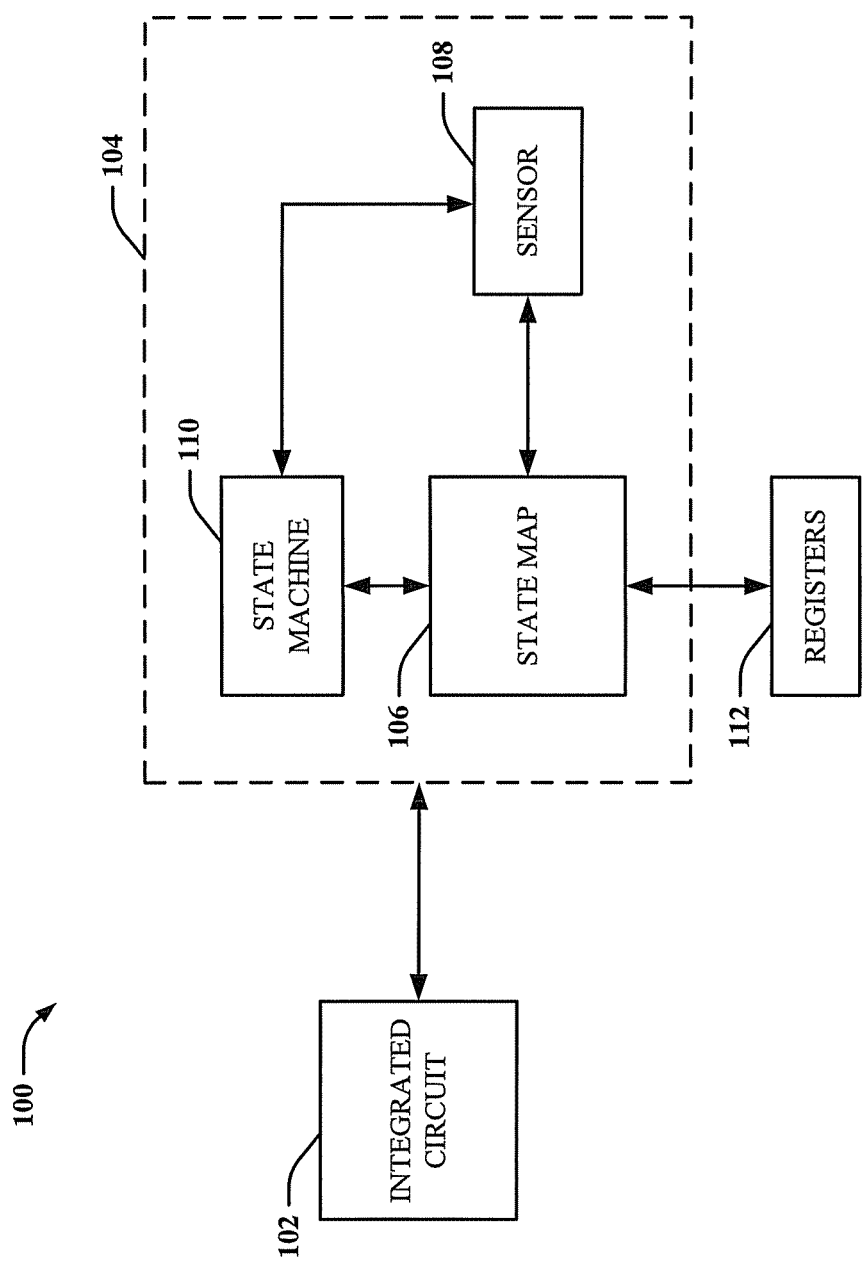
FIG. 1 illustrates a block diagram of an example system that implements a state map to control operations in a sensor according to aspects of the subject disclosure.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

As utilized herein, terms "component," "system," and the like are intended to refer to an electronic or computing entity, either hardware, software (e.g., in execution), or firmware. For example, a component can be one or more semiconductor transistors, an arrangement of semiconductor transistors, a circuit, data transfer or integration circuitry, an electronic clock, a process running on a processor, a processor, an object, a state machine, a computer, etc. By way of illustration, a circuit, a transistor array electrically connected with the circuit, or a controller that manages data flow between the transistor array and the circuit can be a component. Furthermore, an apparatus can comprise one or more components that operate together as a system. For instance, the apparatus can comprise an arrangement of electronic hardware, data transfer circuits, logical control circuits, memory circuits that store processing instructions, and a processing circuit that implements the processing instructions in a manner suitable to perform an electronic or computing task.

Furthermore, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The term "article of manufacture" as used herein is intended to encompass an electronic device, a semiconductor device, a computer, or a computer program accessible from any computer-readable device, carrier, or media. By way of example, and not limitation, computer-readable media can include hardware media, or software media. In addition, the media can include storage media, transport media or communication media. For example, computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include a data transfer bus, a signal interface (e.g., a wireless communication interface), or the like. Of course, those skilled in the art will recognize many modifications can be made to this configuration without departing from the scope or spirit of the disclosed subject matter.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Referring to the drawings, FIG. 1 illustrates a block diagram of a sensor system 100 for implementing a state map 106. The sensor system 100 can manage and/or facilitate operational states of an image sensor. Particularly, the state map 106 can facilitate automatic sequential flow of operations in a sensor 108. In one example, the state map 106 can control operations in a complementary metal-oxide-semiconductor (CMOS) image sensor. An integrated circuit 102 can be configured to generate one or more real time signals to the state map 106. The one or more real time signals can control basic commands (e.g., enter movie mode, read data, etc.) for operations facilitated by the state map 106. A state machine 110 can also receive and/or generate one or more real time signals. The real time signals can be used to determine exit criterion in the state map 106. One or more registers 112 can store data values to program the state map 106 with states. A sensor component 104 can comprise the state map 106, the sensor 108, and the state machine 110. In one embodiment, the sensor component 104 can also comprise the registers 112.

In one example, the integrated circuit 102 is implemented as a field programmable gate array (FPGA). In another example, the integrated circuit 102 is implemented as an application-specific integrated circuit (ASIC). However, any type of reprogrammable chip may be implemented to generate a clock signal (e.g., a synchronization signal) or other basic command signals for the state map 106.

The state map 106 may be a table with at least one location. Each location can contain a single destination state. A state map pointer can be implemented to move sequentially through the locations to highlight (e.g., activate) one destination state at a time and/or to provide a current location in the state map 106. In one example, the state map 106 contains 128 locations. However, it is to be appreciated that the number of location can be varied to meet the design criteria of a particular implementation. The exit criterion causes the state map 106 to leave a particular destination state by triggering the state map pointer to advance to the next destination state. The exit criterion can be configured as an action and/or a signal. The sensor component 104 can automatically move from one destination state to another destination state by implementing the exit criterion.

The active function of the sensor component 104 is determined by the destination state. The destination state is an instruction (e.g., a command) to the sensor component 104 that tells the sensor component 104 what operation to perform (e.g., to wait, to read out data, etc.). The destination state can determine the current activity state of the sensor 108. Examples of common destination states include, but are not limited to, a wait command, a rolling readout command, and a rolling reset command. Each of the destination states can be stored in the state map 106.

In one example, when the sensor component 104 leaves a standby state and enters a tactical state, the state map pointer activates (e.g., highlights) location 0 in the state map 106. Location 0 is the first state map location. The operational status of the sensor 108 can be determined by the destination state in the location 0. After exiting the location 0, the state map pointer can move sequentially to location 1 in the state map 106. Similarly, the state map pointer can move sequentially through the remaining locations in the state map 106. After exiting the final location in the state map 106 (e.g., location 127), the state map pointer automatically returns to the first location (e.g., the location 0) and begins the sequence of the state map 106 again.

The state map 106 can be generated using a manual mode and/or a minicode mode. In the manual mode, real-time Serial Peripheral Interface (SPI) commands can be written to program the state map to transition to a different state in the state map 106. In the minicode mode, pre-set sequences of state in the state map 106 can be generated. The sequences can include, but are not limited to, loops, subroutines, and/or conditional branching to non-sequential locations in the state map 106.

The state machine 110 can be implemented to interface the state map 106 to other components. The state machine 110 can also manage signals generated by the state map 106. For example, if the state map 106 is in a readout state, a signal can be sent to the state machine 110 to notify the state machine 110 that the state map 106 is in a readout state. As a result, the state machine 110 can notify the necessary component (e.g., the sensor 108) to start reading out data. The state machine 110 can also provide conditional information to the state map 106. The conditional information can be the exit criteria for a destination state in the state map 106. For example, the state machine 110 can send an end-of-file condition (e.g., EOF signal) to the state map 106. The EOF signal can notify the state map 106 when reading out data is complete (e.g., an exit criterion). The state machine 110 can be implemented in the sensor component 104. However, the state machine 110 can also be implemented externally from the sensor component 104 (e.g., in the integrated circuit 102). The state machine 110 can also be implemented as multiple state machines. For example multiple state machines can be implemented to manage different types of signals and/or sensor functions.

Implementation of the state map 106 on the sensor component 104 allows interfaces on the sensor component 104 to be minimized, resulting in reduced costs and/or increased reliability of the sensor component 104. The state map 106 can be programmed for the end use of the sensor component 106. As such, the state map 106 allows the sensor component 106 to be implemented for multiple applications. Additionally, the state map 106 allows more complex operations to be implemented on the sensor component 106 to provide increased performance and/or functions. Interaction of real time signals and non-real time signals can also be simplified by implementing the state map 106. Thus, a simplified architecture can be provided to implement CMOS sensor operation states.

Figure 2:
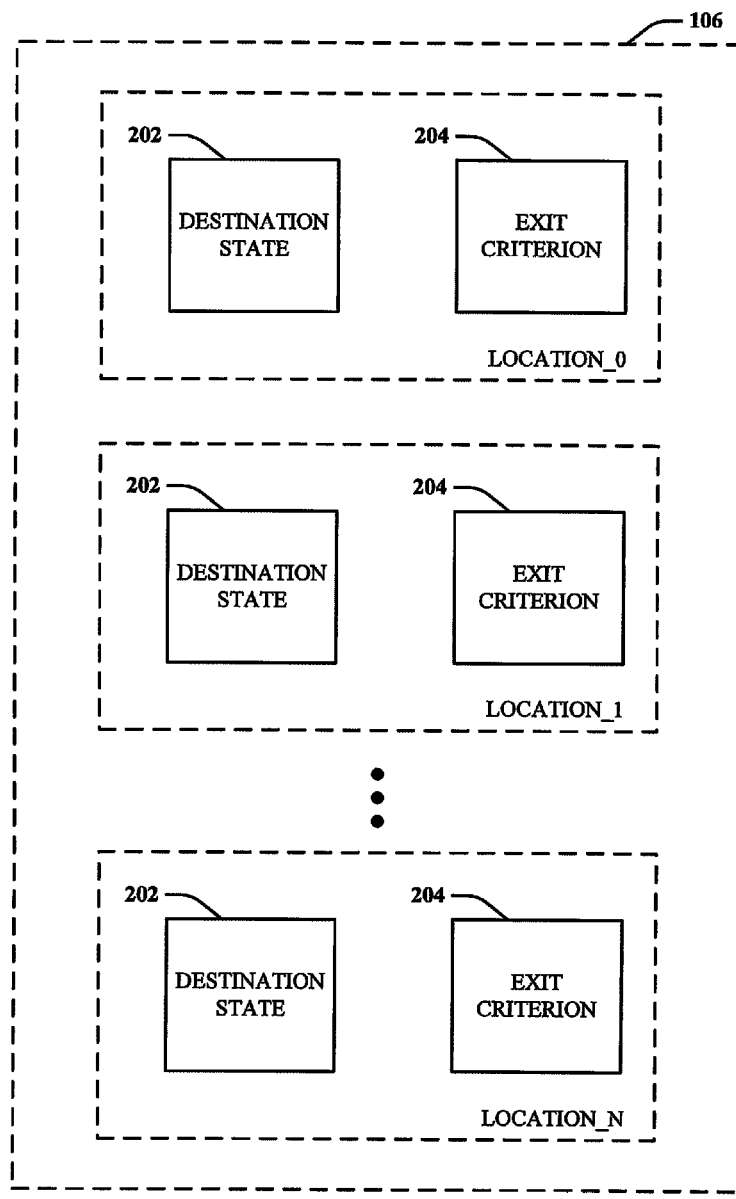
FIG. 2 depicts a block diagram representation of the state map.

FIG. 2 illustrates an example of the state map 106. The state map 106 comprises one or more locations (e.g., LOCATION_0-LOCATION_N). Each of the locations comprises a destination state 202 and an exit criterion 204. In one example, the state map comprises 128 locations. However, it is to be appreciated that the number of locations may vary depending on the design criteria of a particular implementation. The exit criterion 204 can be an action and/or a signal. The state map 106 leaves a particular location (e.g., destination state) and moves to a next location named in the next destination state when the exit criterion 204 is met. Exit criterion 206 can include, but is not limited to, a rising edge of a drive signal (e.g., a vertical drive (VD) signal), an end-of-frame (EOF) signal, a signal denoting an end of global state machine activity (e.g., a END_GSM signal), an expiration of a timer in the integrated circuit 102, the state machine 110 or the registers 112, and/or an immediate exit. For example, when one of the destination states 202 is a readout state, the sensor 108 continues to read out rows until an EOF signal is sensed by the state map 106. When the state map 106 receives the EOF signal, the state map pointer moves to the next location in the state map sequence. The state map pointer can provide a current location in the state map 106.

The one or more locations LOCATION_0-LOCATION_N in the state map 106 can comprise a state map sequence. The state map sequence can be implemented sequentially (e.g., the first state map location proceeds to the second state map location, which then proceeds to the third state map location, etc.). However, the state map sequence can also be implemented non-sequentially. Therefore, each of the one or more locations can proceed to any of the one or more locations. For example, a location 2 in the state map 106 can proceed to a location 5 in the state map 106. In one example, a go to signal (e.g., DSC_GOTO) can be implemented to send the state map pointer to a named target location.

Figure 3:
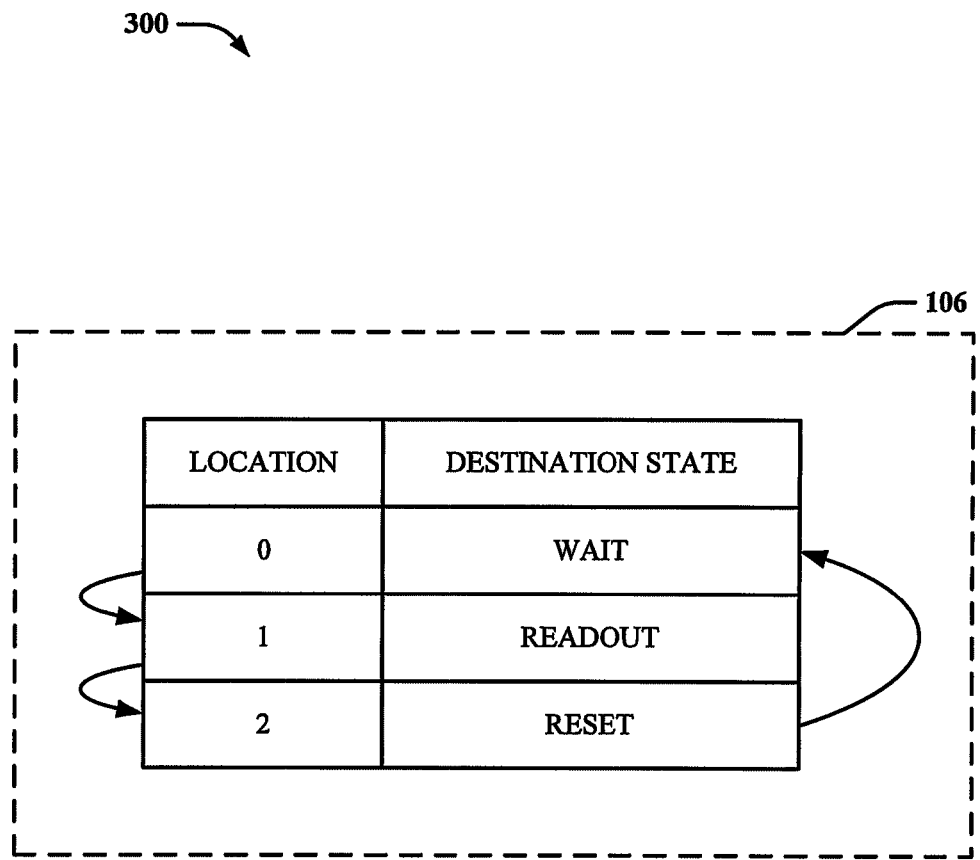
FIG. 3 illustrates an example state map sequence.

FIG. 3 illustrates an example of a state map sequence 300. The state map sequence 300 starts in location 0 where the state map 106 is in a wait state until an exit criterion has been met (e.g., when a timer expires). Then, the state map sequence 300 proceeds to location 1 where the state map 106 is in a readout state until another exit criterion has been met (e.g., when done reading out data). Next, the state map sequence 300 proceeds to location 2 where the state map 106 is in a reset state. Then, after the state map sequence 300 finishes the reset (e.g., the exit criterion), the state map sequence 300 automatically returns to the location 0 to restart the state map sequence 300.

A number of different destination states can be implemented depending on the design criteria of a particular state map sequence. For example, a destination state can include, but is not implemented to, a reset state, a wait state, a go to state, a halt state, a test state, a no operation state, a video readout state, an exit state, a transfer state, a pause state, a go to subroutine state, a resume state, etc. The destination states can correspond to functions and/or operations for the sensor 108. For example, a destination state can transfer a row and/or column of pixel data on the sensor 108. In another example, the destination state can transfer content (e.g., data) from the registers 112. The destination state can also be implemented to replace normal headers and/or trailers data with a hexadecimal value. In yet another example, one or more of the destination states can be implemented to control one or more operations in the state machine 110.

State map looping can be implemented in the state map 106. The state map looping allows a state map sequence to be repeated until a specified event modifies the loop. In one example, the specified event is a new SPI write to a state map location. In another example, the specified event can be a new result of a conditional test. However, it is to be appreciated that different types of specified events can be configured depending on the design criteria of a particular implementation. State map loops and tests can be set up in advance. As a result, the number of SPI writes needed for operations can be minimized by allowing the sensor component 104 to move automatically to new states.

In a manual mode, a user can create the loop (e.g., a state map sequence) that continually runs a single destination state until an SPI command is issued to change to a different destination state. A first destination state can represent a set of operations (e.g., a readout and then a wait). A second destination state can be implemented to tell the state map pointer to return to the first location. Therefore, the state map pointer will loop continuously through the two programmed state map locations. In one example, the loop can be implemented as a movie-mode loop. In the first location (e.g., location 0), the sensor 108 can read out all the rows in a frame. When an end-of-frame (EOF) signal is reached (e.g., the exit criteria is reached), the sensor component 104 can automatically enter a wait state without incrementing the state map pointer to the next location. On a rising edge of a vertical drive (VD) signal (e.g., the exit criteria for the wait state), the state map pointer can advance to the next location (e.g., location 1). Location 1 in the state map 106 can instruct the state map pointer to return to the first state and start reading out row again. The first location state will not change in the manual mode until a new destination state is written to the state map location 0 using and SPI. The SPI command can be written to one of the registers 112 corresponding to the location 0.

The state map 106 can also implement conditional branching. Conditional branching within the state map 106 occurs when the sensor component 104 tests a value in one of the registers 112. Based on the results of testing the value in one of the registers 112, the state map 106 can jump to different locations (e.g., destination states). The value in one of the registers 112 can be tested by implementing single-test conditional branching or case-statement conditional branching.

Figure 4:
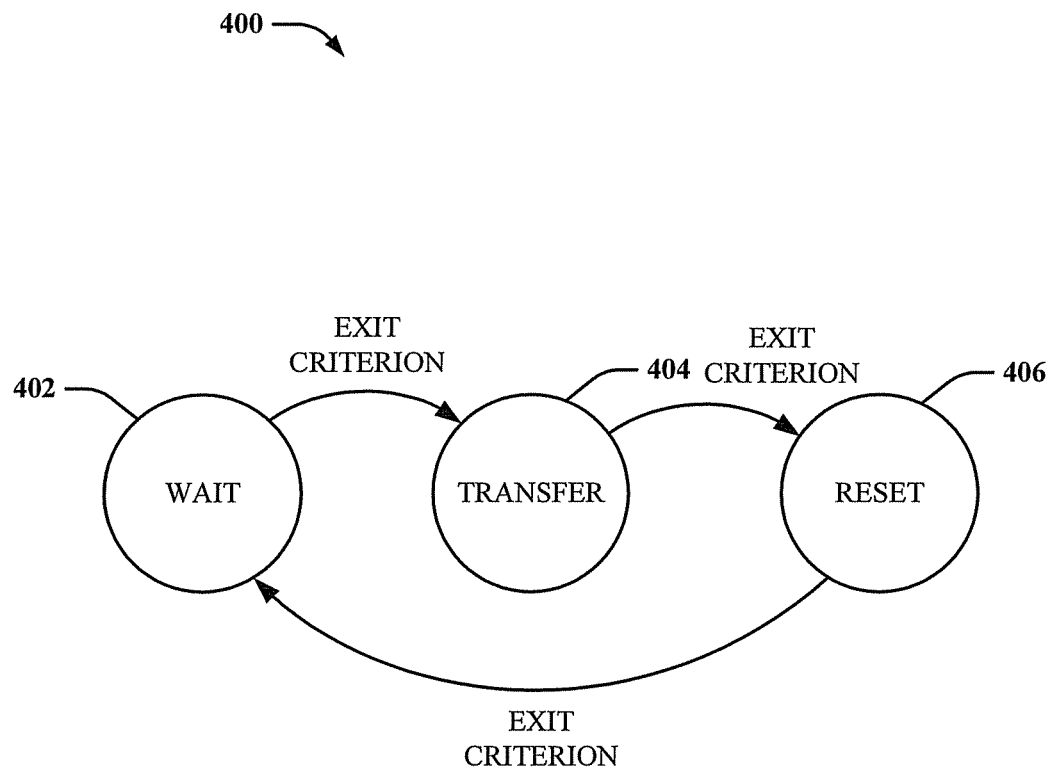
FIG. 4 depicts an example state diagram sequence.

FIG. 4 illustrates an example of a state diagram sequence 400. The state diagram sequence 400 illustrates the state map sequence 300. The state diagram sequence 400 can start, for example, in the state 402 where the state map 106 is in a wait state until an exit criterion has been met (e.g., when a timer expires). Then, the state diagram sequence 400 proceeds to the state 404 where the state map 106 is in a readout state until an exit criterion has been met (e.g., when done reading out data). Next, the state diagram sequence 400 proceeds to the stage 406 where the state map 106 is in a reset state. Then, after the state diagram sequence 400 finishes the reset (e.g., the exit criterion), the state diagram sequence 400 automatically returns to the state 402 to restart the state map sequence 300. It is to be appreciated that a state diagram sequence for any type of state map sequence can be generated depending on the design criteria of a particular implementation.

Figure 5:
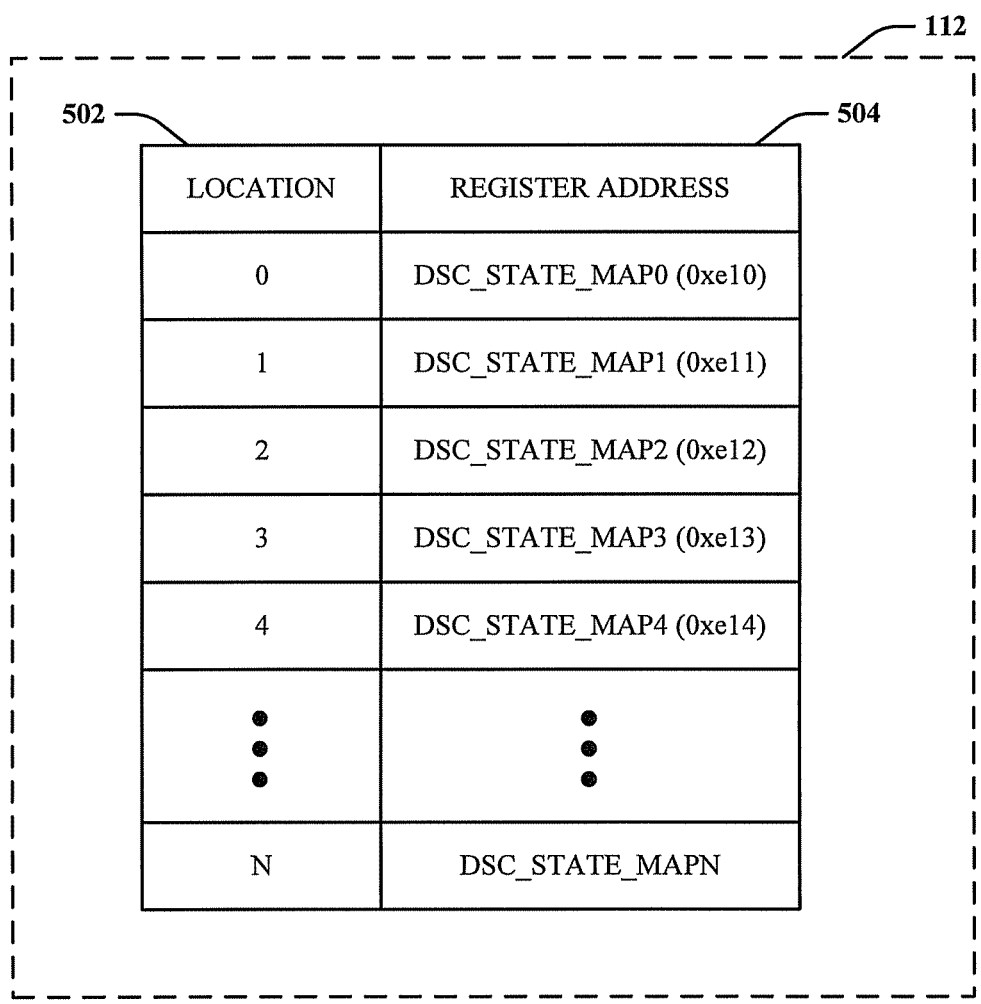
FIG. 5 illustrates an example diagram of registers implemented in the sensor component.

FIG. 5 illustrates an example diagram of the registers 112. The locations 502 correspond to a particular state map location. Each of the locations (e.g., location 0-location N) can correspond to one register. In one example, the registers 112 comprise 128 registers (e.g., registers 0-register 127) associated with 128 locations (e.g., location 0-location 127) in the state map 106. However, it is to be appreciated that the number of registers can be varied to meet the design criteria of a particular implementation. The registers 112 can be implemented separate from the sensor component 104. However, it is to be appreciated that the registers 112 can also be implemented in the sensor component 104. In one example, each register is implemented as an 8-bit register. In another example, each register is implemented as a 16-bit register. Each register comprises a register address 504 (e.g., DSC_STATE_MAP0 (0xe10)). The data written to each state map location register address 504 is a numerical value that represents a particular destination state and/or variable input. For example, the destination state DSC_GOTO can be written to a register to send the state map pointer to a named target location. In one example, the data values are hexadecimal values. However, it is to be appreciated that different types of data values can be stored in the registers 112 depending on the design criteria of a particular implementation. The registers 112 can be an SPI writable address. Therefore, a user (e.g., programmer) can store pre-set definitions in the registers 112 to allow automatic sequential flow of operations in the state map 106. In another example, SPI commands can be written to the registers 112 during a manual mode to advance to a different destination state in the state map 106.

Content stored in the registers 112 can be transferred in response to a destination state action. More than one register (e.g., two or three registers) can hold data for one destination state and/or one or two variable input data. For example, variable input data can be contained in a first state map register following a register containing the destination state. In another example, variable input can be contained in two state map registers following the one register containing the destination state. For destination states comprising a 16-bit value, the upper 8-bits of the value can be the first of the adjacent locations, and the lower 8-bits can be the second location following the destination state.

Figure 6:
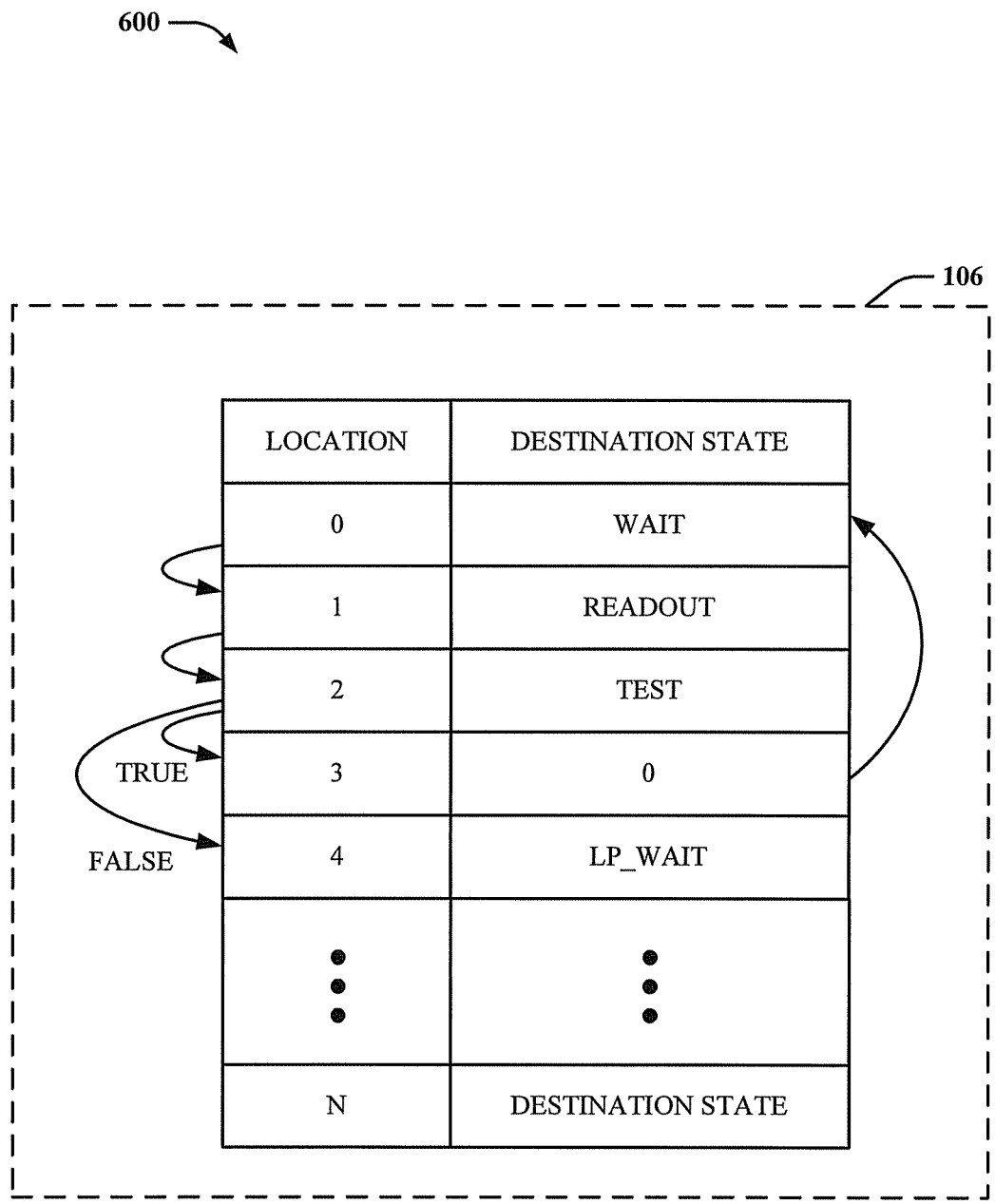
FIG. 6 illustrates a state map implementing single-test conditional branching.

FIG. 6 illustrates the state map 106 implementing a single-test conditional branching sequence 600. Single-test conditional branching tests to determine if one of the registers 112 holds a particular value. The test is either true or false (e.g., a logical value "1" or "0", an "on" or "off" value, etc.). If the test is true, the command acts as a go to state and a branch is taken to the state map target contained in the following state map location. If the test is false, the branch is not taken. For example, the test can occur in location 2 of the state map 106. If the result of the test is true, the state map 106 proceeds to the next location in the sequence (e.g., location 3). If the result of the test is false, the state map 106 proceeds to a different location than the next location in the sequence (e.g., location 4). The state map 106 can stay in the state until an exit criteria has been met. In one example, location 3 in the state map 106 can return to location 0 in the state map 106 after an exit criterion for location 3 has been met.

Figure 7:
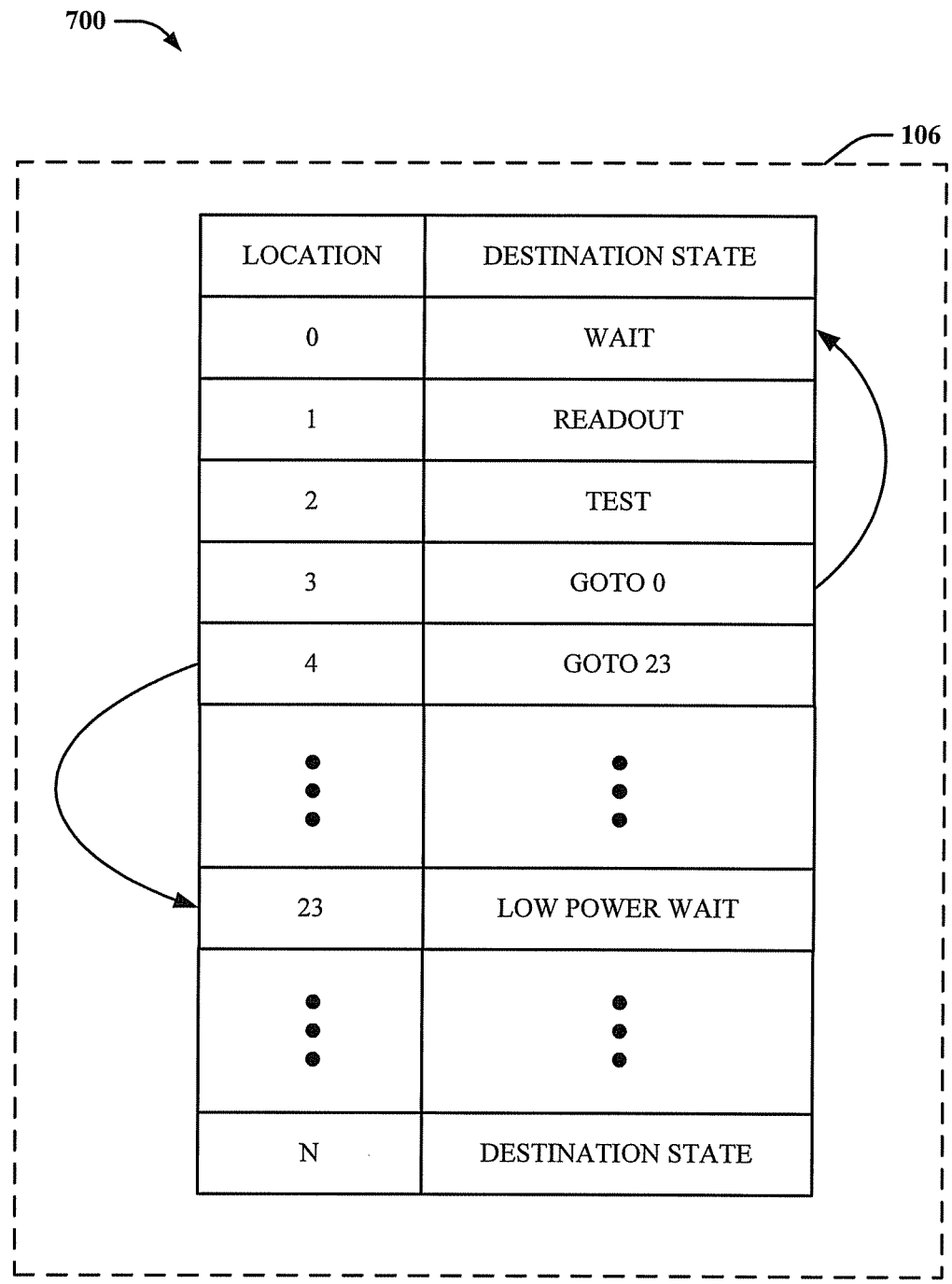
FIG. 7 illustrates a state map implementing case-statement conditional branching.

FIG. 7 illustrates the state map 106 implementing a case-statement conditional branching sequence 700. Case-statement conditional branching also uses a test to determine the next state map location to which the state map pointer is sent. However, instead of testing whether a value in one of the registers 112 is true or false, case-statement conditional branching determines what value is present in one of the registers 112. For example, case-statement conditional branching can determine which of eight possible states is true. However, it is to be appreciated that the number of possible states can be varied. The case-statement test can use a special destination state as a test state. In one example, location 2 in the state map 106 can be a test state to test the value of one of the registers 112. The eight state map locations that follow the special destination state can each correspond to one of the possible values of the particular minicode register. After testing the value in the register associated with location 2, the state map pointer can proceed to the location that corresponds to the actual value in the register associated with location 2. The next eight state map locations following location 2 (e.g., locations 3-10) can be used to specify the location in the state map 106 to advance to if the result of the test for the particular location is true. If the result of the test is false, the sensor component 104 can determine which location in the state map 106 to proceed to by viewing the location stored in the next location (e.g., location 3). If the result of the test is true, the sensor component 104 can determine which location in the state map 106 to proceed to by viewing the location stored two locations ahead (e.g., location 4). The next six locations can be used to determine the other six test results.

Figure 8:
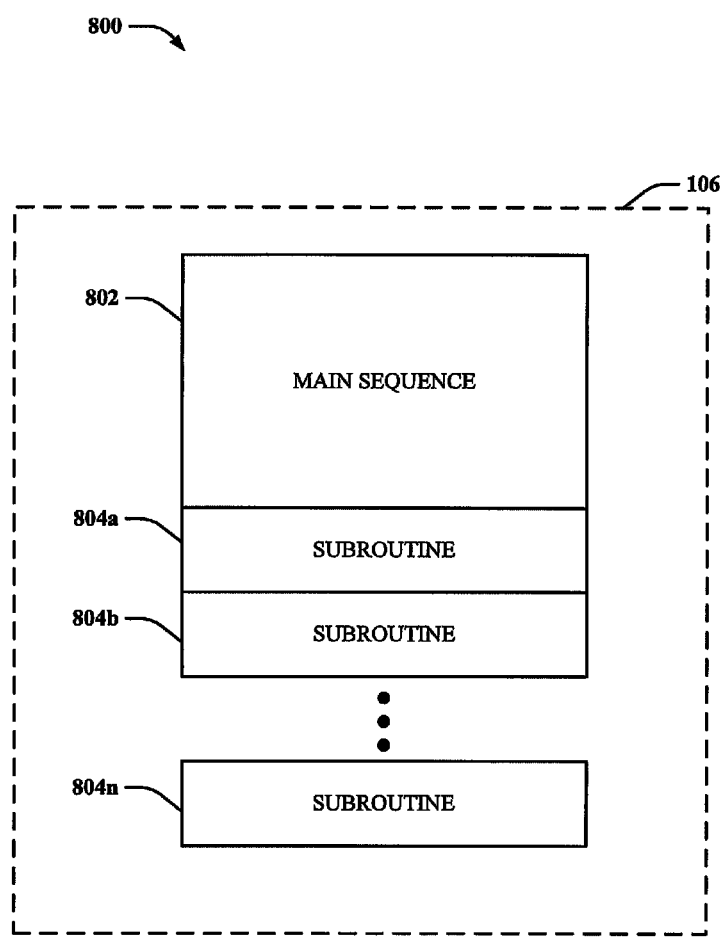
FIG. 8 illustrates a state map implementing a main sequence and one or more subroutines.

FIG. 8 illustrates the state map sequence 800 implementing a main sequence 802 and subroutines 804a-n. The state map 106 can implement one or more subroutines. A state map subroutine is a sequence of destination states (e.g., locations in the state map 106) that is programmed to function as a unit. The subroutine unit (e.g., subroutines 804a-n) can be stored separate from the main sequence 802 (e.g., main routine) in the state map 106. For example, a subroutine unit 804a-n can be stored at the end of the state map 106. A subroutine can be called with a single destination state (e.g., go to a particular subroutine), from the main sequence of the state map 106. When a subroutine is called, all the operations in the destination states within the subroutine can be executed before the state map pointer returns to the main sequence. The subroutine can be invoked from any point in the main sequence as frequently as needed. For example, a subroutine can be invoked two times during a main sequence in the state map 106. The use of subroutines 804a-n saves space in the state map 106. A particular destination state (e.g., go to a particular subroutine) in the main sequence 802 directs the state map pointer to jump to the first location in the subroutine. A return destination state (e.g., return to the main sequence) within the subroutine can direct the state map pointer to return the main sequence 802 in the state map 106. A subroutine can also be nested within another subroutine. For example, two subroutines (e.g., subroutine 804b and 804c) can each be nested within a main subroutine 804a. Therefore, the subroutines 804b and 804c are both called from the main subroutine 804a and not the man sequence 802.

In one embodiment, state map routines can be implemented for global shutter operations. Correlated double sampling (CDS) can be used to measure a video signal with an integration time longer than half of a frame time, but shorter than a whole frame time. Because of this timing, global reset (GR) pulses occur during CDS video readout frames. When GR pulses take place during a certain readout frame, the readout frame is generally temporarily halted, or paused, in order for the global reset to occur. A series of destination states can be implemented to create the pause in operations and the return to normal operations. Because the CDS reset pause is a recurring event, implementing a pause sequence of destination states into a subroutine that can be called whenever a pause is required increases the efficiency of the state map 106. Therefore, a single destination state (e.g., GOSUB) can be written into the state map 106 whenever a pause is needed, rather than all the destination states that make up the pause sequence.

In view of the exemplary diagrams described supra, process methods that may be implemented in accordance with the disclosed subject matter will be better appreciated with reference to the flow charts of FIGS. 9-13. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter. Additionally, it should be further appreciated that the methods disclosed hereinafter and throughout this specification are capable of being stored on an article of manufacture to facilitate transporting and transferring such methods to an electronic device. The term article of manufacture, as used, is intended to encompass a computer program accessible from any computer-readable device, device in conjunction with a carrier, or storage medium.

Figure 9:
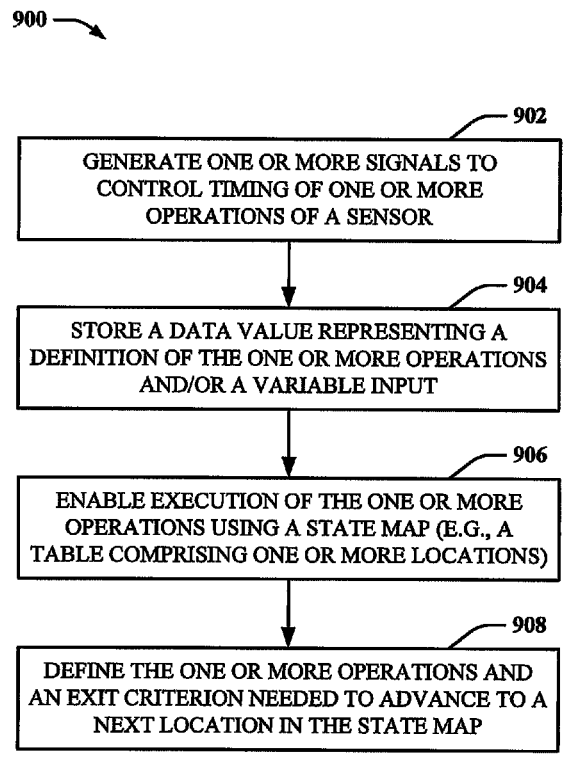
FIG. 9 illustrates a flowchart of an example method for implementing a state map to control operations in a sensor.

FIG. 9 illustrates a flowchart of an example method 900 for implementing the state map 106 to control operations in the sensor component 104 according to one or more aspects of the subject disclosure. At 902, method 900 can comprise generating one or more signals to control timing of one or more operations of a sensor. As an example, the one or more signals can be real time signals (e.g., timing signals) to control the one or more operations. The one or more signals can be received from the integrated circuit 102 and/or the state machine 110. In one example, the one or more signals can also be configured as an exit criterion signal for the one or more operations.

At 904, method 900 can comprise storing a data value representing a definition of the one or more operations and/or a variable input. As an example, the data value can represent one of the destination states. The data value can be stored in a particular memory address of the registers 112 corresponding to a particular one of the destination states.

At 906, method 900 can comprise enabling execution of the one or more operations using a state map (e.g., the state map 106). The state map 106 can be a table comprising one or more locations. As an example, the one or more locations can be a position within the state map 106 that contains a particular value (e.g., a destination state, an exit criterion, a variable, etc.).

At 908, method 900 can comprise defining the one or more operations and an exit criterion needed to advance to a next location in the state map 106. As an example, the one or more operations can be defined by the destination state. The exit criterion can cause the state map 106 to advance in response to an action and/or signal (e.g., the one or more signals) received by the sensor component 104. Advancing to the next location in the state map 106 can be sequential or non-sequential.

Figure 10:
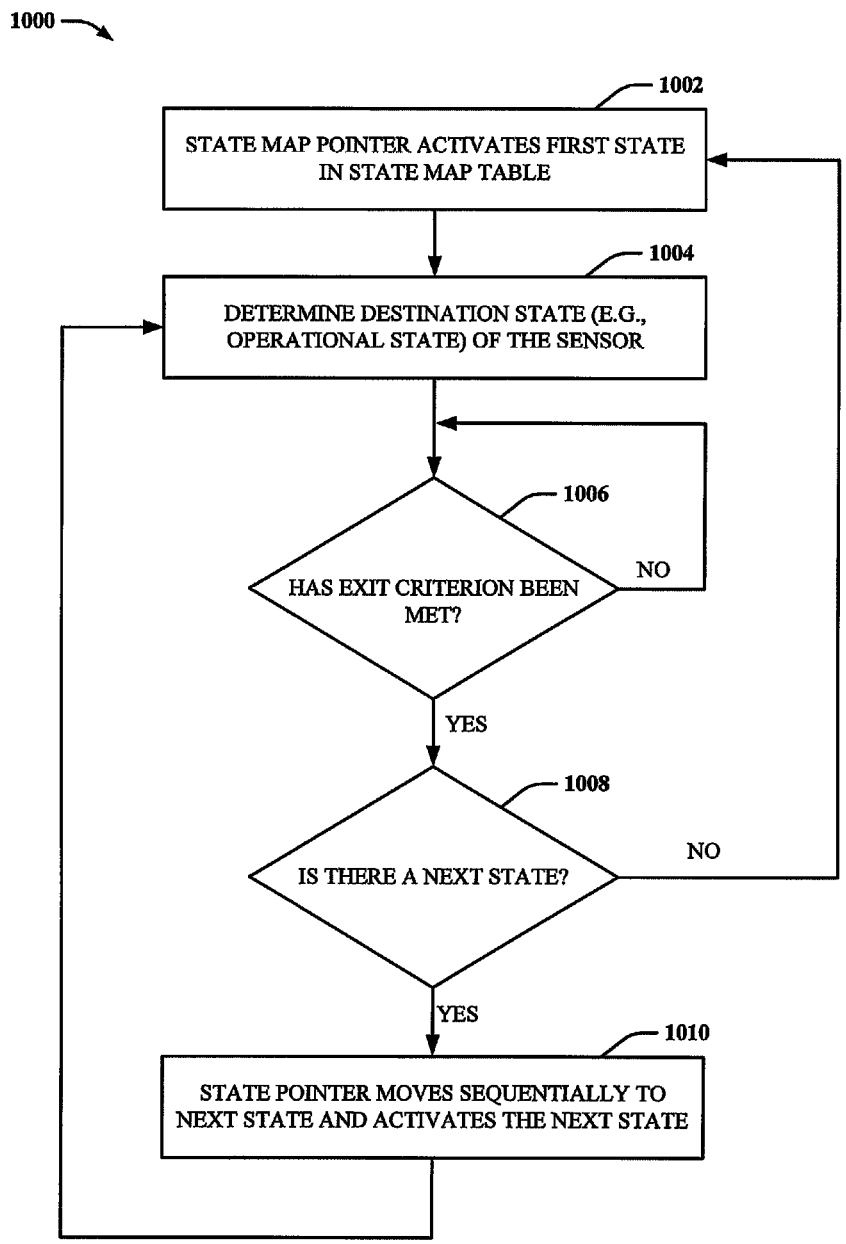
FIG. 10 illustrates a flowchart of an example method for implementing a sequence in the state map.

FIG. 10 illustrates a flowchart of an example method 1000 for implementing a sequence in the state map 106 according to one or more aspects of the subject disclosure. At 1002, method 1000 can comprise activating a first state in a state map table using a state map pointer. At 1004, method 1000 can comprise determining a destination state (e.g. an operational state) of the sensor 108. At 1006, method 1000 can comprise determining if an exit criterion has been met. If no, the method 1000 remains in the first state until the exit criterion has been met. If yes, the method 1000 proceeds to 1008. At 1008, method 1000 can comprise determining if there is a next state. If no, the method 1000 returns to 1002 to restart the method 1000. If yes, method 1000 proceeds to 1010. At 1010, method 1000 can comprise moving sequentially to a next state and activating the next state using the state pointer.

Figure 11:
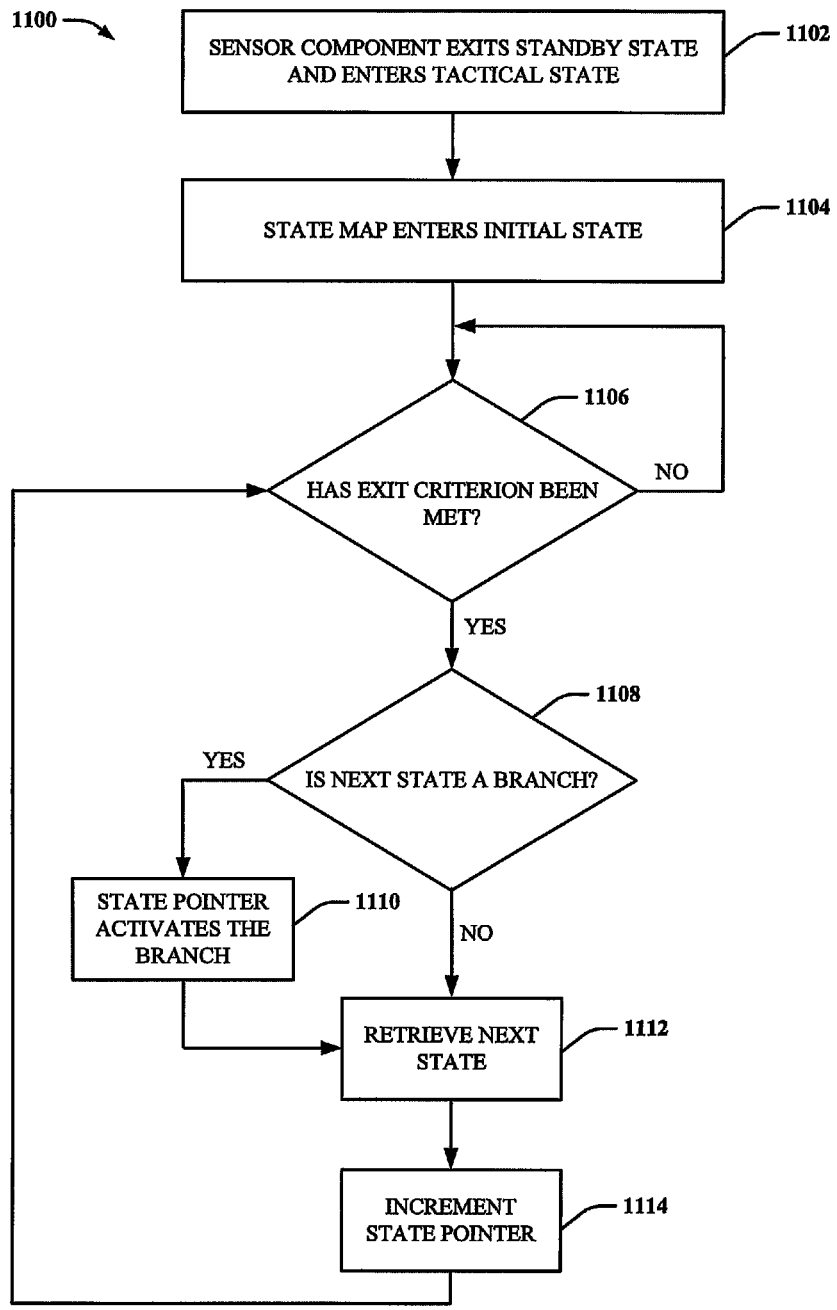
FIG. 11 illustrates a flowchart of another example method for implementing a sequence in the state map.

FIG. 11 illustrates a flowchart of an example method 1100 for implementing a sequence in the state map 106 according to one or more aspects of the subject disclosure. At 1102, method 1100 can comprise exiting the standby state and entering a tactical state of the sensor component 104. At 1104, method 1100 can comprise entering an initial state of the state map 106. At 1106, method 1100 can comprise determining if an exit criterion has been met. If yes, method 1100 proceeds to 1108. If no, method 1100 remains in the 1106 until the exit criterion has been met. At 1108, method 1100 can comprise determining if a next state is a branch. If yes, a state pointer can activate the branch at 1110. If no, method 1100 can retrieve the next state at 1112. Then, at 1114, method 1100 can comprise incrementing the state pointer to activate a next state. Next, method 1100 returns back to state 1106 to remain in the next state until an exit criterion has been met.

Figure 12:
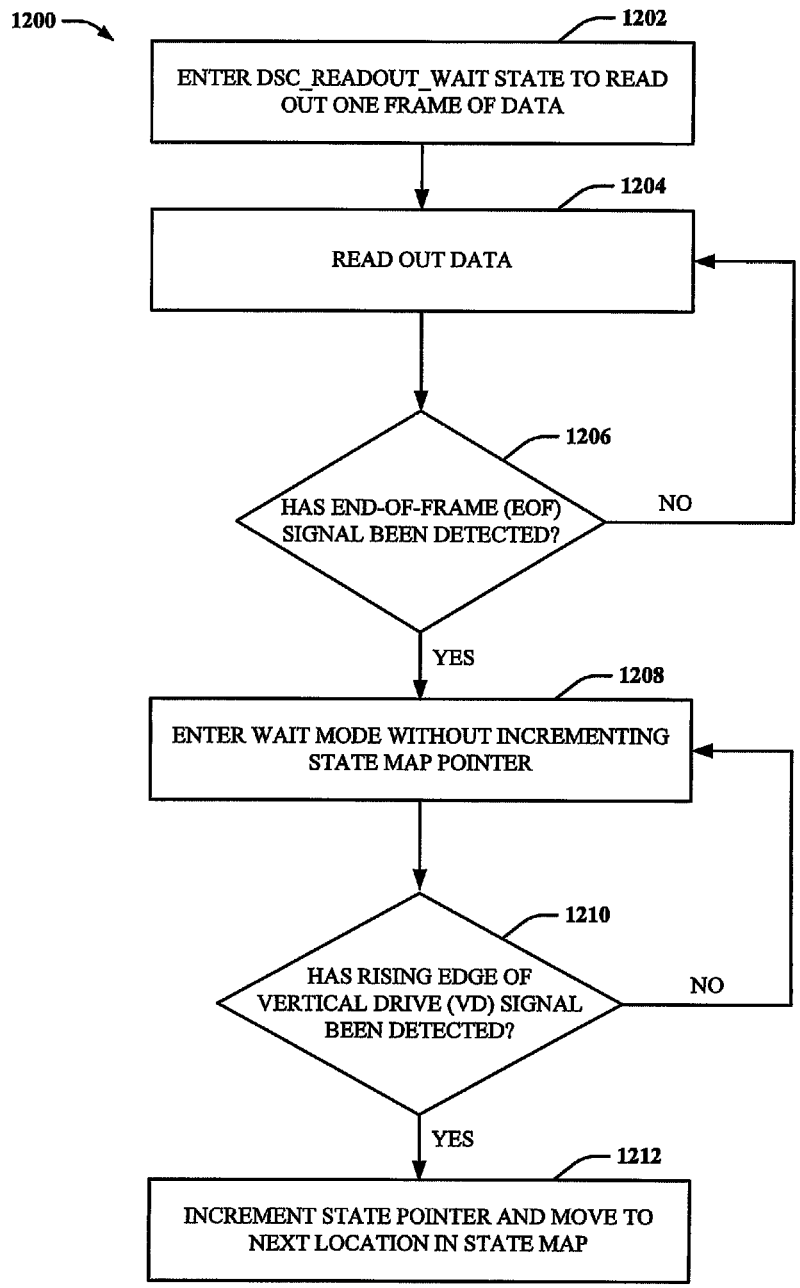
FIG. 12 illustrates a flowchart of an example method for implementing multiple sensor instructions in a single destination state.

FIG. 12 illustrates a flowchart of an example method 1200 for implementing multiple sensor instructions in a single destination state according to one or more aspects of the subject disclosure. As such, the state map 106 can implement a sequence using more than one exit criteria. At 1202, method 1200 can comprise entering a DSC_READOUT_WAIT state to read one frame of data. At 1204, method 1200 can comprise reading out the data. At 1206, method 1200 can comprise determining if an end-of-frame (EOF) signal has been detected. If yes, method 120 continues to 1208. If no, method 1200 continues to read out data until the EOF signal has been detected. At 1208, method 1200 can comprise entering a wait mode without incrementing the state map pointer. At 1210, method 1200 can comprise determining if a rising edge of a vertical drive (VD) signal has been detected. If yes, method 1200 continues to 1212. If no, method 1200 remains in the wait mode until the VD signal has been detected. At 1212, method 1200 can comprise incrementing the state pointer and moving to a next location in the state map 106. As such, method 1200 can comprise more than one exit criteria to continue to a next location in the state map 106.

Figure 13:
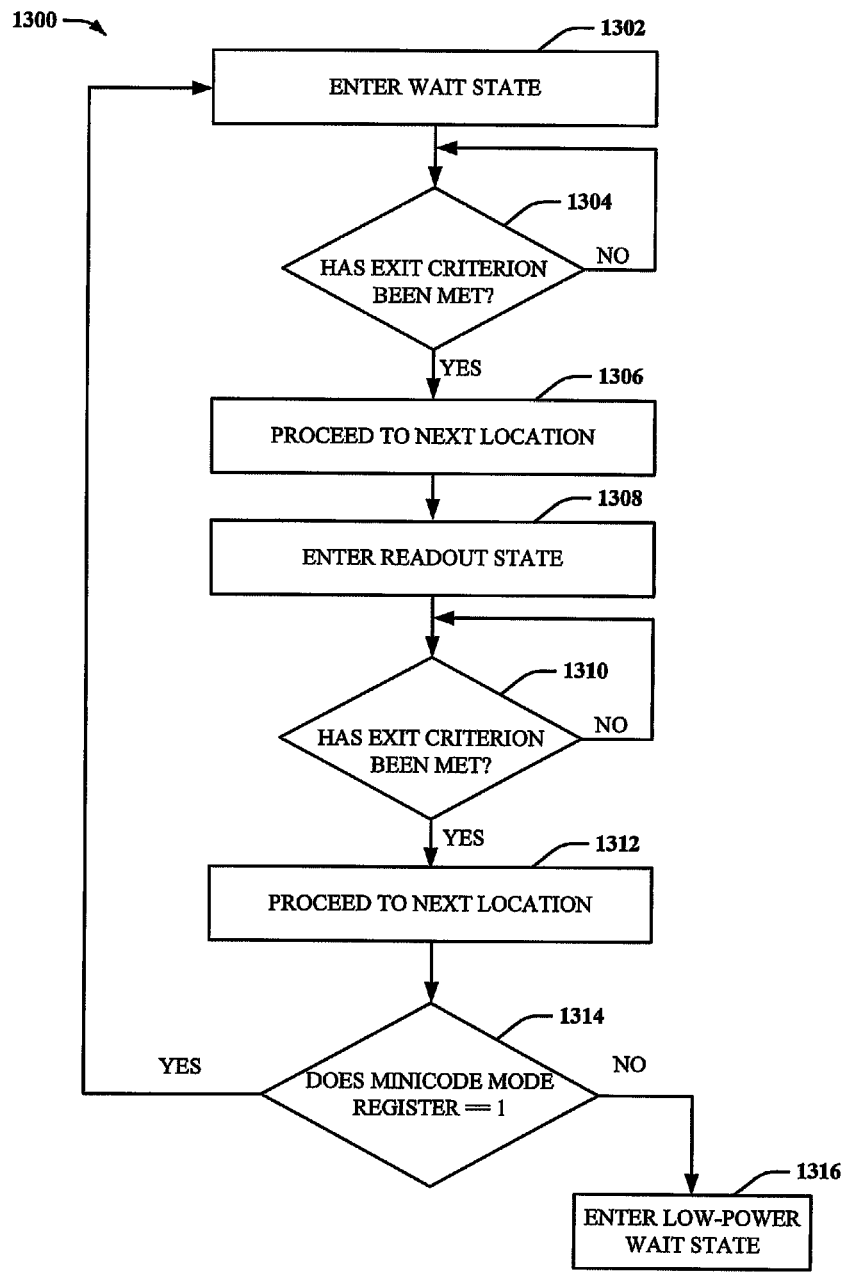
FIG. 13 illustrates a flowchart of an example method for implementing a sequence in the state map using single-test conditional branching.

FIG. 13 illustrates a flowchart of an example method 1300 for implementing the state map 106 using single-test conditional branching according to one or more aspects of the subject disclosure. In one example, the 1300 can be implemented for a movie mode (e.g., sensor waits, then reads out data). At 1302, method 1300 can comprise entering a wait state. At 1304, method 1300 can comprise determining if an exit criteria has been met. If yes, method 1300 proceeds to 1306. If no, method 1300 stays in the wait state until the exit criteria has been met. At 1306, method 1300 can comprise proceeding to a next location in the state map 106. At 1308, method 1300 can comprise entering a readout state. At 1310, method 1300 can comprise determining if a new exit criteria has been met. If yes, method 1300 proceeds to 1312. For example, the sensor component 104 can exit the readout state when an EOF signal is detected. If no, method 1300 stays in the readout state until the new exit criteria has been met. At 1312, method 1300 can proceed to a next location. At 1314, method 1300 can comprise determining if a minicode mode register is equal to a logic value 1 (e.g., an "on" state, a Boolean data value, a true value, etc.). For example, 1314 can comprise a test to see if a value in the registers 132 is equal to certain value. If yes, method 1300 returns to 1302. For example, the sensor component 104 can repeat the movie mode loop. If no, method 1300 proceeds to 1316. At 1316, method 1300 can comprise entering a low-power wait state. For example, the low-power wait state can be implemented for power management of the sensor component 104.

Figure 14:
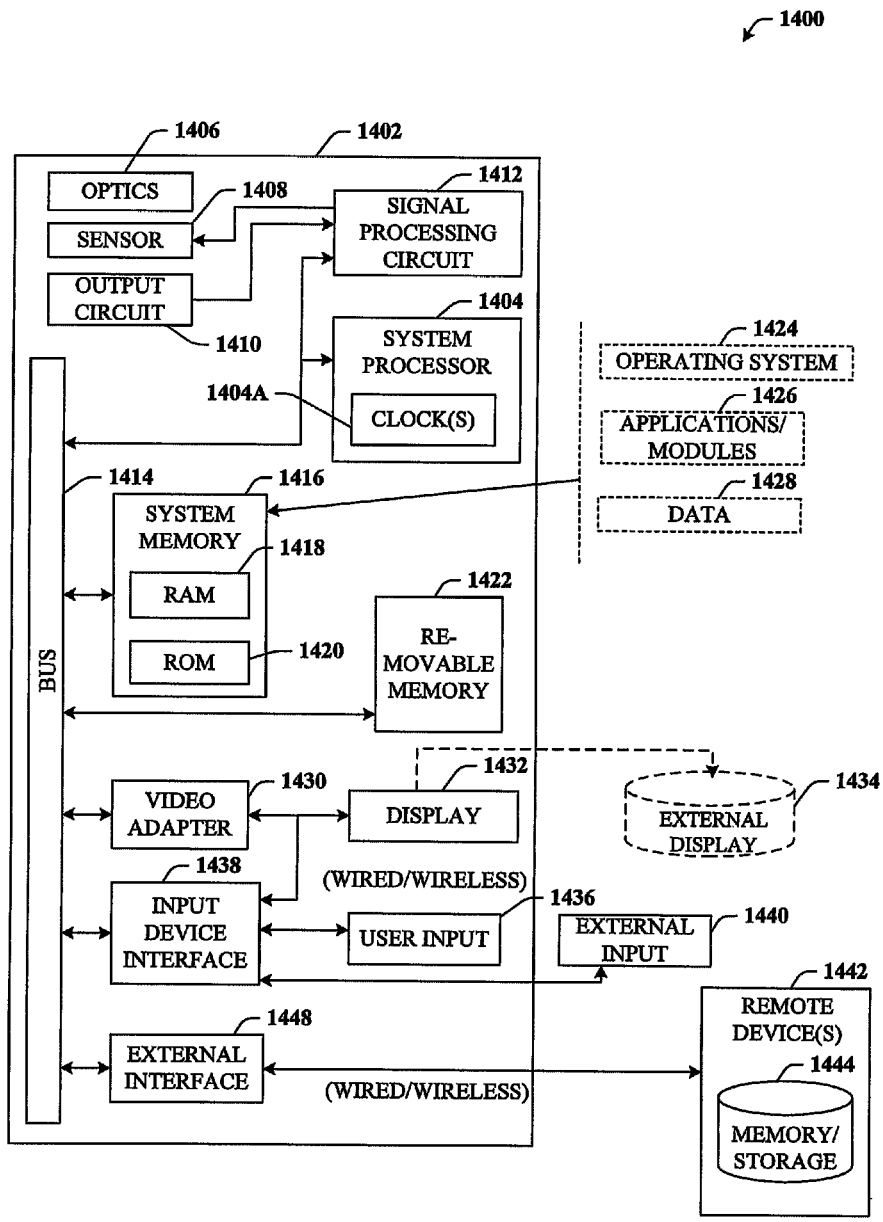
FIG. 14 depicts an example operating environment that can be employed in accordance with various disclosed aspects.

Referring now to FIG. 14, there is illustrated a block diagram of an exemplary digital camera system operable to execute the disclosed architecture. In order to provide additional context for various aspects of the various embodiments, FIG. 14 and the following discussion are intended to provide a brief, general description of a suitable electronic computing environment 1400 in which the various aspects of the various embodiments can be implemented. Additionally, while the various embodiments described above may be suitable for application in the general context of instructions that may run or be executed in conjunction with an electronic device, those skilled in the art will recognize that the various embodiments also can be implemented in combination with other program modules and/or as a combination of hardware and software.

Generally, program modules include routines, programs, components, data structures, etc., that perform particular tasks associated with electronic computing environment 100. Moreover, those skilled in the art will appreciate that the inventive methods can be practiced with other electronic system configurations, including hand-held computing devices, microprocessor-based or programmable consumer electronics, single-processor or multiprocessor state machines, mini-computers, as well as personal computers, and the like, each of which can be operatively coupled to one or more associated devices.

The illustrated aspects of the various embodiments may also be practiced in distributed computing environments where certain tasks are performed by remote processing devices that are linked through a wired or wireless communications network. In a distributed computing environment, program modules can be located in both local and remote memory storage devices.

An electronic processing device typically includes a variety of computer-readable media. Computer-readable media can be any available media that can be accessed by the electronic processing device and includes both volatile and non-volatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, or any other medium which can be used to store the desired information and which can be accessed by the electronic processing device.

Continuing to reference FIG. 14, the exemplary electronic processing environment 1400 for implementing various aspects of one or more of the various embodiments includes a digital camera 1402, the digital camera 1402 including a system processor 1404, optics 1406, an image sensor 1408, an output circuit 1410, a signal processing circuit 1412, a system memory 1416 and a system bus 1414. The system bus 1414 couples to system components including, but not limited to, the system memory 1416 to the system processor 1404. The system processor 1404 can be a suitable semiconductor processing device manufactured for digital camera 1402, or any of various commercially available processors. Dual microprocessors and other multi-processor architectures may also be employed as the system processor 1404.

Optics 1406 can comprise one or more lens elements comprised of refractive material. The refractive material can be suitable to refract electromagnetic radiation, particularly in the visible spectrum, but also the near infrared or ultraviolet spectra, or other suitable spectra. Particularly, optics 1406 can be configured to project and focus an image of an object onto image sensor 1408. Optics can also be configured with an actuator (not depicted) to mechanically adjust optics 1406 to focus objects at varying distances from digital camera 1402. The Optics 1406 can also be manufactured on the surface of sensor 1408 and thereby integrated in the IC production process. Consequently, it is possible to electronically control the integrated optics 1406 via the exemplary means disclosed herein. Since optics 1406 may require interframe and intraframe modulation of the image-forming characteristics, the present invention can enable quick performance optimization within digital camera 1402, sensor system 100 or sensor component 104, depending on the application.

Image sensor 1408 can comprise any of various sensors for receiving electromagnetic radiation and generating electric signals proportionate to a magnitude of the electromagnetic radiation. For instance, image sensor 1408 can comprise a video tube, a charge-coupled device, or a CMOS device, or the like, or an array of such devices. In a particular example, image sensor 1408 can comprise the sensor component 104 as described herein (e.g., state map 106, sensor 108, state machine 110, etc.). Electric signals generated by image sensor 1408 can be transferred to output circuit 1410, in response to a clock signal generated by an electronic clock(s) 1404A managed by system processor 1404. The electric signals can then be output to signal processing circuit 1412 for image processing.

Signal processing circuit 1412 can be any suitable hardware or software processing entity, including an integrated circuit(s), a field programmable gate array (FPGA), an application specific integrated circuit(s) (ASIC), a state machine, or other suitable signal processing device. Signal processing circuit 1412 can be configured to perform operations on electric signals provided by output circuit 1410. These operations can include correlated double sampling, gamma processing including programmable knee functionality further facilitated by the present invention, analog to digital conversion, gain adjustment, interpolation, compression, or a combination thereof or of the like, to generate digital data to be adapted for presentation on an electronic display 1432 of digital camera 1402. Additionally, signal processing circuit 1412 can store the digital data in system memory 1416 before, during and after the operations.

The system bus 1414 can be any of several types of bus structure suitable for communicatively connecting components of digital camera 1402. System bus 1414 can further interconnect to a memory bus (with or without a memory controller), a peripheral bus, and a local bus using any of a variety of commercially available bus architectures. The system memory 1416 can include read-only memory (ROM) 1420 and random access memory (RAM) 1418. A basic input/output system (BIOS) for digital camera 1402 can be stored in a non-volatile memory 1420 such as ROM, EPROM, EEPROM, which BIOS contains the basic routines that help to transfer information between elements within the digital camera 1402, when powered on for instance. The RAM 1418 can also include a high-speed RAM such as static RAM for caching data. Furthermore, digital camera can include removable memory 1422, which can include any suitable non-volatile memory (e.g., Flash memory), or other removable memory technology.

A number of program modules can be stored in the system memory 1416, including an operating system 1424, one or more application programs or program modules 1426 and program data 1428. All or portions of the operating system, applications, modules, and/or data can also be cached in the RAM 1418 It is appreciated that the various embodiments can be implemented with various commercially available or proprietary operating systems or combinations of operating systems.

A display 1432 is also connected to the system bus 1414 via an interface, such as a video adapter 1430. Display 1432 can comprise a flat panel display, such as a liquid crystal display, a light-emitting diode display, or the like. System processor 1404 can control output of image data to present a digital replica of the image received by image sensor 1408 on display 1432. In addition, digital camera 1402 can output the image data to an external display 1434 via a suitable external interface 1448.

A user can enter commands and information into the digital camera 1402 through one or more input devices, e.g., touch screen buttons, switches, dials, levers, etc. For instance, zoom functionality is often implemented by pressing a button, dial, lever, etc., in one direction to zoom in, or another direction to zoom out. Further, display options, selection of images, and similar display commands can be input via a touch screen, often implemented as part of display 1432. Other input devices (not shown) may include a microphone, an IR remote control, a joystick, a game pad, a stylus pen, or the like. These and other input devices are often connected to the system processor 1404 through an input device interface 1438 that is coupled to the system bus 1414, but can be connected by other interfaces, such as a parallel port, an IEEE1394 serial port, a game port, a USB port, an IR interface, a Bluetooth interface, etc.

The external interface 1448 can include at least one or both of Universal Serial Bus (USB) and IEEE1394 interface technologies. Other external connection technologies are within contemplation of the subject matter claimed herein. Moreover, external interface 1448 can include a wireless technology, such as a Wi-Fi communication technology, Bluetooth™ technology, infrared (IR) technology, cellular technology, or the like. In addition to an external display, external interface 1448 can facilitate communicatively coupling digital camera 1402 to one or more remote devices 1442. Remote device(s) 1442 can include a computer, a display, a memory or storage device 1444, and so on. Moreover, commands can be given to digital camera 1402 from remote device(s) 1442 over external interface 1448 to system processor 1404. This can facilitate remote control of digital camera 1402, for remote camera operation (e.g., taking pictures, adding or deleting pictures from system memory 1416, etc.), transferring data, such as stored digital images, updating operation system 1424, applications/program modules 1426, or data 1428, and so on.

The digital camera 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth wireless technologies. Thus, the communication can be a predefined structure as with a conventional network or simply an ad hoc communication between at least two devices.

Wi-Fi, or Wireless Fidelity, allows connection to the Internet from various locations within range of a WiFi access point, without wires. Wi-Fi is a wireless technology similar to that used in a cell phone that enables such devices, e.g., computers, to send and receive data indoors and out; within the range of the access point. Wi-Fi networks use radio technologies called IEEE802.11(a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the various embodiments. It is, of course, not possible to describe every conceivable combination of components or methods for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. An apparatus, comprising:
    an integrated circuit configured to generate one or more clock signals to control timing of a set of operations performed by an image sensor external to the integrated circuit;
    a sensor component associated with the image sensor that is configured to implement the set of operations based on a state map and the one or more clock signals generated by the integrated circuit, wherein the state map is a table that comprises a set of sequential locations where each location in the set of sequential locations is associated with a destination state to define an operation from the set of operations that is performed by the image sensor, and an exit criterion to sequentially advance to a next location in the state map that is associated with another operation performed by the image sensor that is different than the operation; and
    one or more registers each configured to store a data value to represent one of the destination states.

2. The apparatus of claim 1, wherein the state map further comprises a state map pointer that incrementally moves through the state map as defined by the set of sequential locations in response to the exit criterion and provides a current location in the state map.

3. The apparatus of claim 2, wherein the state map pointer automatically returns to a first location in the state map after exiting a final location in the state map.

4. The apparatus of claim 1, wherein two or more locations from the set of sequential locations comprise a corresponding subroutine sequence of destination states.

5. The apparatus of claim 1, wherein the exit criterion causes the state map to advance to the next location in response to the one or more clock signals.

6. The apparatus of claim 1, wherein the exit criterion causes the state map to advance to the next location in response to an action and/or signal generated by a state machine.

7. The apparatus of claim 1, wherein the exit criterion includes one or more of a rising edge of a signal, an end-of-frame signal, a signal denoting an end of state machine activity, an expiration of a timer, or an immediate exit.

8. The apparatus of claim 1, wherein the state map is generated using real-time Serial Peripheral Interface (SPI) commands to specify the destination state for each of the set of sequential locations.

9. The apparatus of claim 1, wherein the state map is generated using pre-set sequences, wherein the pre-set sequences include conditional branching to non-sequential locations in the state map.

10. The apparatus of claim 1, wherein a sequence associated with the set of sequential locations is repeated until the exit criterion is met.

11. The apparatus of claim 1, wherein the state map proceeds to a specific location from the set of sequential locations based on the data value in the one or more registers.

12. The apparatus of claim 1, wherein the state map further comprises one or more subroutines executed separate from the set of operations.

13. The apparatus of claim 1, wherein each location from the set of sequential locations is associated with a particular one of the one or more registers.

14. A method, comprising:
    receiving one or more clock signals from an integrated circuit to control timing of a set of operations performed by an image sensor;
    storing a data value representing a definition of an operation from the set of operations that is performed by the image sensor;
    enabling execution of the set of operations based on a state map and the one or more clock signals received from the integrated circuit, wherein the state map is a table comprising a set of sequential locations; and
    defining the set of operations and a single exit criterion needed to sequentially advance to a next location in the state map that is associated with another operation performed by the image sensor that is different than the operation.

15. The method of claim 14, further comprising determining if the exit criterion has been met to advance to the next location in the state map.

16. The method of claim 14, further comprising returning to a first location in the state map after exiting a final location in the state map.

17. The method of claim 14, further comprising repeating a sequence of the set of sequential locations until the exit criterion is met.

18. The method of claim 14, further comprising proceeding to a specific location from the set of sequential locations based on the data value.

19. The method of claim 14, further comprising advancing to one or more subroutines separate from the set of sequential locations in response to an operation from the set of operations.

20. A system, comprising:
- means for receiving one or more signals from an integrated circuit to control timing of a set of operations performed by an image sensor;
- means for storing a data value representing a definition of an operation from the set of operations performed by the image sensor;
- means for enabling execution of the set of operations based on a state map and the one or more signals received from the integrated circuit, wherein the state map is a table comprising a set of sequential locations; and
- means for defining the set of operations and a single exit criterion to sequentially advance to a next location in the state map that is associated with another operation performed by the image sensor that is different than the operation.

* * * * *